Oct. 23, 1928.
C. F. WAGNER
1,688,567
BUS BAR STRUCTURE
Filed Sept. 24, 1920
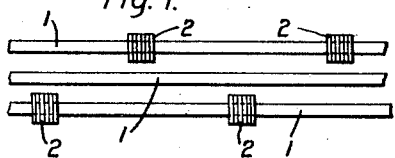
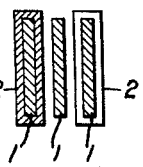
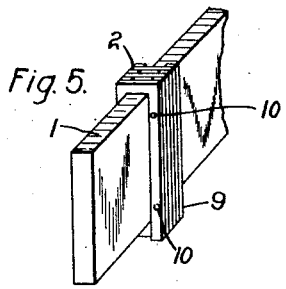
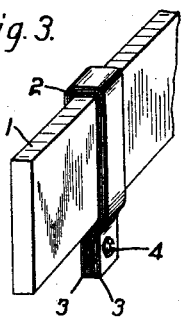
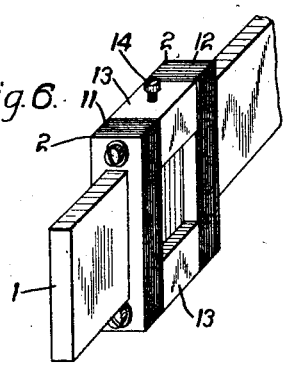
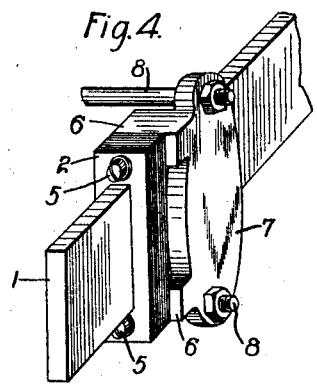
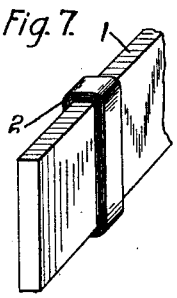
WITNESSES:
INVENTOR
Charles F. Wagner
BY
ATTORNEY Patented Oct. 23, 1928.

1,688,567

UNITED STATES PATENT OFFICE.

CHARLES F. WAGNER, OF PITTSBURGH, PENNSYLVANIA, ASSIGNOR TO WESTINGHOUSE ELECTRIC & MANUFACTURING COMPANY, A CORPORATION OF PENNSYLVANIA.

BUS-BAR STRUCTURE.

Application filed September 24, 1920. Serial No. 412,461.

My invention relates to electrical conductors and it has for its object to provide means for balancing or equalizing the currents in parallel inductively-related conductors.

In parallel-connected, and other inductively-related conductors, such as bus-bars for alternating-current circuits, it is well known that the inner conductor or conductors are cut by a larger number of magnetic flux lines than the outer conductors. The inner conductors, therefore, have a greater reactance and, since the same potential exists between the ends of all the conductors, the current will be greater in the outer conductors. This condition is undesirable inasmuch as it prevents the utilization of all of the conductors at their maximum efficiency.

It is a well known fact that in an alternating current circuit, when a conductor is surrounded by a magnetizable member, the impedance to the flow of current in that circuit is increased.

In practicing my invention, I so place magnetizable members of predetermined form and dimensions with respect to the associated conductors as to equalize the reactance of the conductors, thereby causing the total current to be equally distributed between the conductors and effecting maximum efficiency of the combined conductors.

Assuming that a multi-conductor bus-bar comprises three bars arranged in parallel relation, and that the resistance of each bar is 1 ohm and that 300 amperes of current are flowing through the three bars, then the watt loss of each bar is equal to $100^2 \times 1$ or 10000 watts. The total watt loss caused by the normal resistance of the three bars is 30,000 watts.

Assuming that, on account of impedance caused by the induction effect of the outer bars upon the inner bar, the flow of current in the inner bar is reduced to 50 amperes, then the outer bars must carry 125 amperes each in order that a flow of 300 amperes be maintained.

The watt loss of each outer bar is equal to $125^2 \times 1$ or 15,625. The combined watt loss of the two outer bars is 31,250 watts. The watt loss of the inner bar is $50^2 \times 1$ or 2500. The total watt loss in the unbalanced system is 33,750 watts or 11.2% greater than that of the balanced system. It is apparent that an appreciable economy is effected by the balanced current system. Balancing of the currents also brings the currents into phase and further increases the efficiency of the group of bars.

Figure 1 of the accompanying drawings is a diagrammatic plan view of a portion of a multi-conductor bus-bar embodying my invention.

Fig. 2 is a transverse sectional view of the device shown in Fig. 1, and

Figs. 3 to 7, inclusive, are detail views of modified forms of magnetizable members and their relation to bus-bars embodying my invention.

Referring to Figs. 1 and 2, a plurality of bus-bars 1, or other conductors, which are arranged substantially in parallel relation, may be separate conductors or they may be connected at their ends to form a composite single conductor. The outer conductors are provided with a plurality of magnetizable core members 2 that are disposed at intervals of desired length. The core members on each conductor are arranged in staggered relation to the corresponding core members on the other conductor so that interference between the core members is prevented. By varying the number of the core members 2 on a bus-bar, and also the amount of iron in each core member, any desired distribution of current may be obtained.

The core members 2, in Figs. 1 and 2, are severally constructed of a plurality of laminations that are placed in position over the ends of the bars 1.

In the arrangement shown in Fig. 3, the core member 2 is formed of several superposed layers of magnetizable material, preferably of strap construction and disposed in face-to-face relation with respect to the bus bar and with respect to each other, having open-end portions 3 secured together by a screw 4 or other suitable means. This construction facilitates the mounting of the core members by permitting them to be placed thereon in the operative position of the conductors.

In the modification shown in Fig. 4, the core member 2 is constructed similar to the core members of Figs. 1 and 2 and is held in position by screws 5 extending therethrough against a lug 6 of a bracket member 7 that may be supported by bolts 8 to a wall or frame structure not shown.

In Fig. 5, the core member 2 is constructed of laminations 9 of substantially U-shape that are passed over the edges of the bar, alternately from above and below, and held together by rivets 10 or other suitable means.

In Fig. 6, the core member 2 is divided into two groups 11 and 12 that are spaced apart by blocks 13, one of which may be omitted and one or both of which may be provided with a screw 14 for spacing and mounting the groups 2 on the bus-bar.

In Fig. 7, the core member 2 is similar to the core member of Fig. 3, with the exception that the laminations thereof are each a continuous member and, as in Figs. 1, 2, 4 and 6, they must be placed on the bus-bar by passing the same over the end of the bus-bar.

While I have shown and described particular forms of my invention, changes may be effected therein without departing from the spirit and scope thereof, as set forth in the appended claims.

I claim as my invention:—

1. The combination with a plurality of inductively related alternating current conductors, of current responsive means for effecting a predetermined selective distribution of current therein.

2. The combination with a plurality of inductively related parallel alternating current conductors, of current responsive means for effecting a predetermined selective distribution of current therein.

3. The combination with a plurality of inductively related alternating current conductors, of magnetic means for effecting a predetermined selective distribution of current therein.

4. The combination with a plurality of inductively related alternating current conductors, of magnetizable members disposed adjacent the outermost conductors for effecting a substantially uniform distribution of current therein.

5. The combination with a plurality of inductively related alternating current conductors, of magnetizable members disposed adjacent certain selected conductors for effecting a predetermined relative distribution of current therein.

6. The combination with a plurality of inductively related alternating current conductors, of laminated magnetizable members embracing certain conductors for effecting a predetermined selective distribution of current therein.

7. The combination with a plurality of parallel inductively related alternating current conductors, of magnetizable members disposed on alternate conductors and longitudinally displaced with respect to each other for effecting the distribution of current in the conductors.

8. The combination with a plurality of parallel inductively related conductors, of means for effecting a plurality of local magnetic flux circuits around alternate conductors to effect the distribution of current therein.

9. The combination with a plurality of inductively-related conductors, of magnetizable members each of which surrounds one only of the conductors for effecting the distribution of current in the conductors.

10. The combination with a plurality of inductively related alternating current conductors arranged in substantially parallel relation and unsymmetrical with respect to one another, of magnetizable members disposed adjacent to the conductors for effecting a substantially uniform distribution of current therein.

In testimony whereof, I have hereunto subscribed my name this 22nd day of September 1920.

CHARLES F. WAGNER.